(12) United States Patent
Iyer et al.

(10) Patent No.: US 10,091,078 B2
(45) Date of Patent: Oct. 2, 2018

(54) METHOD AND COMPUTING DEVICE FOR SHAPING TRAFFIC ACROSS A WIDE AREA NETWORK

(71) Applicant: Versa Networks, Inc., Santa Clara, CA (US)

(72) Inventors: Sridhar Iyer, Sunnyvale, CA (US); Apurva Mehta, Cupertino, CA (US)

(73) Assignee: VERSA NETWORKS, INC., San Jose, CA (US)

( * ) Notice: Subject to any disclaimer, the term of this patent is extended or adjusted under 35 U.S.C. 154(b) by 122 days.

(21) Appl. No.: 15/148,313

(22) Filed: May 6, 2016

(65) Prior Publication Data

US 2017/0324629 A1    Nov. 9, 2017

(51) Int. Cl.
| | |
|---|---|
| H04L 12/26 | (2006.01) |
| H04L 12/815 | (2013.01) |
| H04L 12/66 | (2006.01) |
| H04L 29/06 | (2006.01) |
| H04L 12/825 | (2013.01) |
| H04L 12/40 | (2006.01) |

(52) U.S. Cl.
CPC .......... *H04L 43/08* (2013.01); *H04L 12/4013* (2013.01); *H04L 12/66* (2013.01); *H04L 43/16* (2013.01); *H04L 47/22* (2013.01); *H04L 47/225* (2013.01); *H04L 47/26* (2013.01); *H04L 65/4092* (2013.01)

(58) Field of Classification Search
CPC ..... H04L 12/26; H04L 12/4013; H04L 43/08; H04L 43/16; H04L 47/22; H04L 47/225; H04L 47/26; H04L 65/4092
See application file for complete search history.

(56) References Cited

U.S. PATENT DOCUMENTS

| | | | | |
|---|---|---|---|---|
| 8,804,571 B1 * | 8/2014 | Tiwari | ................. | H04L 45/025 370/254 |
| 2012/0257526 A1 * | 10/2012 | Moeller | ................ | H04L 41/048 370/252 |
| 2016/0094450 A1 * | 3/2016 | Ghanwani | ........... | H04L 43/0894 370/235 |

OTHER PUBLICATIONS

"Networking with FISH"; http://www.networkingwithfish.com/playing-in-the-lab-dmvpn-and-per-tunnel-qos; Posted on Jun. 15, 2015 by Denise "Fish" Fishburne; pp. 1-9; 2015.
Cisco; "QoS: Policing and Shaping Configuration Guide, Cisco IOS XE Release 3S"; pp. 1-12; Updated Nov. 29, 2015.
Juniper Networks; "Example: Configuring and Applying an Adaptive Shaper"; retrieved from internet May 9, 2016; http://www.juniper.net/documentation/en_US/junos12.1x46/topics/example/cos-adaptive-shaper-security-applying-configuring.html.

\* cited by examiner

*Primary Examiner* — Mewale Ambaye

(57) ABSTRACT

A method for shaping traffic across a wide area network is disclosed. The method involves advertising a data rate limit across a wide area network (WAN) from a first node, measuring the rate of data received at a WAN interface of the first node, and, if the measured rate of data received at the WAN interface of the first node exceeds a maximum threshold, advertising a reduced data rate limit across the WAN, and, if the measured rate of data received at the WAN interface of the first node is below a minimum threshold, advertising an increased data rate limit across the WAN.

16 Claims, 13 Drawing Sheets

| PORT ID: 0 | |
|---|---|
| 1: | 383 |
| 2: | 785 |
| 3: | 1207 |
| 4: | 1651 |
| 5: | 2117 |
| 6: | 2606 |
| 7: | 3119 |
| 8: | 3658 |
| 9: | 4224 |
| 10: | 4819 |
| ... | |
| 93: | 708464 |
| 94: | 744270 |
| 95: | 781867 |
| 96: | 821343 |
| 97: | 862794 |
| 98: | 906317 |

FIG. 8

METHOD AND COMPUTING DEVICE FOR SHAPING TRAFFIC ACROSS A WIDE AREA NETWORK

BACKGROUND

Modern businesses with distributed branches, such as banks or retail locations, are typically interconnected via an enterprise wide area network (WAN). The WAN can be implemented as a physical network or can be implemented in software (e.g., SD-WAN) and can consist of several hubs with each hub having hundreds or thousands of nodes. For example, an enterprise WAN of a bank might have an east coast hub to which hundreds of bank branches along the east coast are connected and a west coast hub to which hundreds of banks branches along the west coast are connected. An east coast bank branch connected to the east coast hub can forward data to other east coast bank branches or to west coast branches by routing data over the east coast hub and west coast hub. Because data is forwarded over hubs before being forwarded to branches, bandwidth limitations at the hubs can cause bottlenecks throughout the network.

SUMMARY

In an embodiment, a method for shaping traffic across a wide area network is disclosed. The method involves advertising a data rate limit across a wide area network (WAN) from a first node, measuring the rate of data received at a WAN interface of the first node, and, if the measured rate of data received at the WAN interface of the first node exceeds a maximum threshold, advertising a reduced data rate limit across the WAN, and, if the measured rate of data received at the WAN interface of the first node is below a minimum threshold, advertising an increased data rate limit across the WAN.

In another embodiment, a data rate limit is advertised to all nodes communicatively coupled to the first node.

In another embodiment, the method further involves advertising the data rate limit to a second node, wherein the advertising to the second node is triggered when data is first received from the second node by the first node.

In another embodiment, the measured rate of data is a dampened measurement determined by averaging a plurality of consecutive measurements.

In another embodiment, advertising the data rate limit by the first node comprises sending Border Gateway Protocol notification messages to nodes communicatively coupled to the first node.

In another embodiment, notification messages sent to nodes of a first tenant advertise a first data rate limit and notification messages sent to nodes of a second tenant advertise a second data rate limit.

In another embodiment, if the first node is receiving more data from the first tenant than the second tenant, advertising a lower data rate limit in the notification messages sent to nodes of the first tenant than the data rate limit advertised in the notification messages sent to nodes of the second tenant.

In another embodiment, if the reduced data rate limit is below a minimum threshold, the reduced data rate limit is not advertised.

In another embodiment, advertising a reduced data rate limit and advertising an increased data rate limit comprises advertising a percent change from the data rate limit.

In another embodiment, upon receiving an initial data transmission from a second node at the first node, advertising a reduced data rate limit to all nodes communicatively coupled to the first node.

In another embodiment, a computing device for shaping traffic across a wide area network is disclosed. The computing device includes a memory and processor, the memory containing instructions that, when executed by the processor, cause the processor to perform steps involving advertising a data rate limit across a wide area network (WAN) from a first node, measuring the rate of data received at a WAN interface of the first node, and if the measured rate of data received at the WAN interface of the first node exceeds a maximum threshold, advertising a reduced data rate limit across the WAN, and if the measured rate of data received at the WAN interface of the first node is below a minimum threshold, advertising an increased data rate limit across the WAN.

In another embodiment, a data rate limit is advertised to all nodes communicatively coupled to the first node.

In another embodiment, wherein the steps performed further involve advertising the data rate limit to a second node, wherein the advertising to the second node is triggered when data is first received from the second node by the first node.

In another embodiment, the measured rate of data is a dampened measurement determined by averaging a plurality of consecutive measurements.

In another embodiment, advertising the data rate limit by the first node comprises sending Border Gateway Protocol notification messages to nodes communicatively coupled to the first node.

In another embodiment, notification messages sent to nodes of a first tenant advertise a first data rate limit and notification messages sent to nodes of a second tenant advertise a second data rate limit.

In another embodiment, if the first node is receiving more data from the first tenant than the second tenant, advertising a lower data rate limit in the notification messages sent to nodes of the first tenant than the data rate limit advertised in the notification messages sent to nodes of the second tenant.

In another embodiment, if the reduced data rate limit is below a minimum threshold, the reduced data rate limit is not advertised.

In another embodiment, advertising a reduced data rate limit and advertising an increased data rate limit involves advertising a percent change from the data rate limit.

In another embodiment, upon receiving an initial data transmission from a second node at the first node, advertising a reduced data rate limit to all nodes communicatively coupled to the first node.

Other aspects and advantages of embodiments of the present invention will become apparent from the following detailed description taken in conjunction with the accompanying drawings.

BRIEF DESCRIPTION OF THE DRAWINGS

FIG. 8 illustrates an exemplary truncated list of rate slabs.

Throughout the description, similar reference numbers may be used to identify similar elements.

DETAILED DESCRIPTION

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment of the present invention. Thus, the phrases "in one embodiment," "in an embodiment," and similar language throughout this specification may, but do not necessarily, all refer to the same embodiment.

Figure 1:
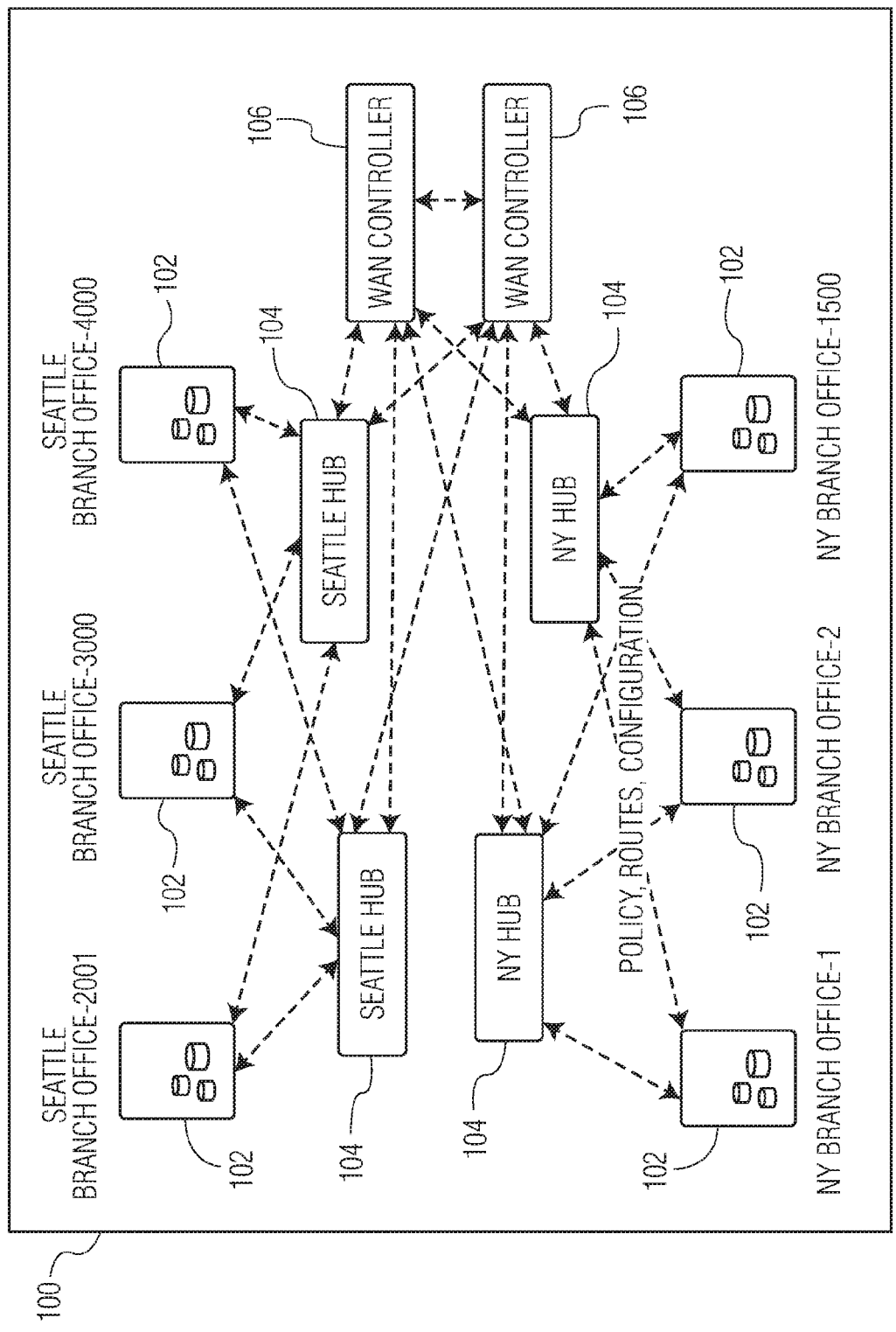
FIG. 1 illustrates a software-defined wide area network (SD-WAN).

FIG. 1 illustrates a software-defined wide area network (SD-WAN) 100. As illustrated, the SD-WAN includes multiple interconnected nodes 102, 104. Nodes can be configured to send data and to receive data transmissions. For simplicity of explanation herein, nodes from which data originates are referred to as "sender nodes" 102 and nodes that receive the data are referred to as "receiver nodes," but each node can be configured to send and receive data in practice. Nodes that interconnect sender nodes and forward data over an SD-WAN are referred to as "hubs" 104. "Hubs" are configured as gateways to an SD-WAN and are managed by SD-WAN controllers 106, which perform virtualization of WAN functionality. In order to provide redundancy, redundant hubs can be used and the nodes of the SD-WAN can be communicatively coupled using an N×N configuration (e.g., each node is coupled to every other node). For example, the node at Seattle Branch office-2001 is communicatively coupled to both Seattle hubs and can send data to either Seattle hub. A sender node can forward data to a recipient node in the SD-WAN by sending the data to a hub to which the sender node is communicatively coupled and the hub can forward the data along to a hub to which the recipient node is communicatively coupled. For example, in order to send data to New York Branch office-1, a node at Seattle Branch office-2001 would send data to one of the redundant Seattle hubs, the hub would forward the data to one of the redundant New York hubs as directed by an SD-WAN controller, and the New York hub would forward the data to a node at New York Branch office-1. In another embodiment, a node at Seattle Branch office-2001 is communicatively coupled to a node at New York Branch office-1 such that data can be sent directly from the node at Seattle Branch office-2001 to the node at New York Branch office-1 without being forwarded to a Seattle hub or a New York hub.

Figure 2A:
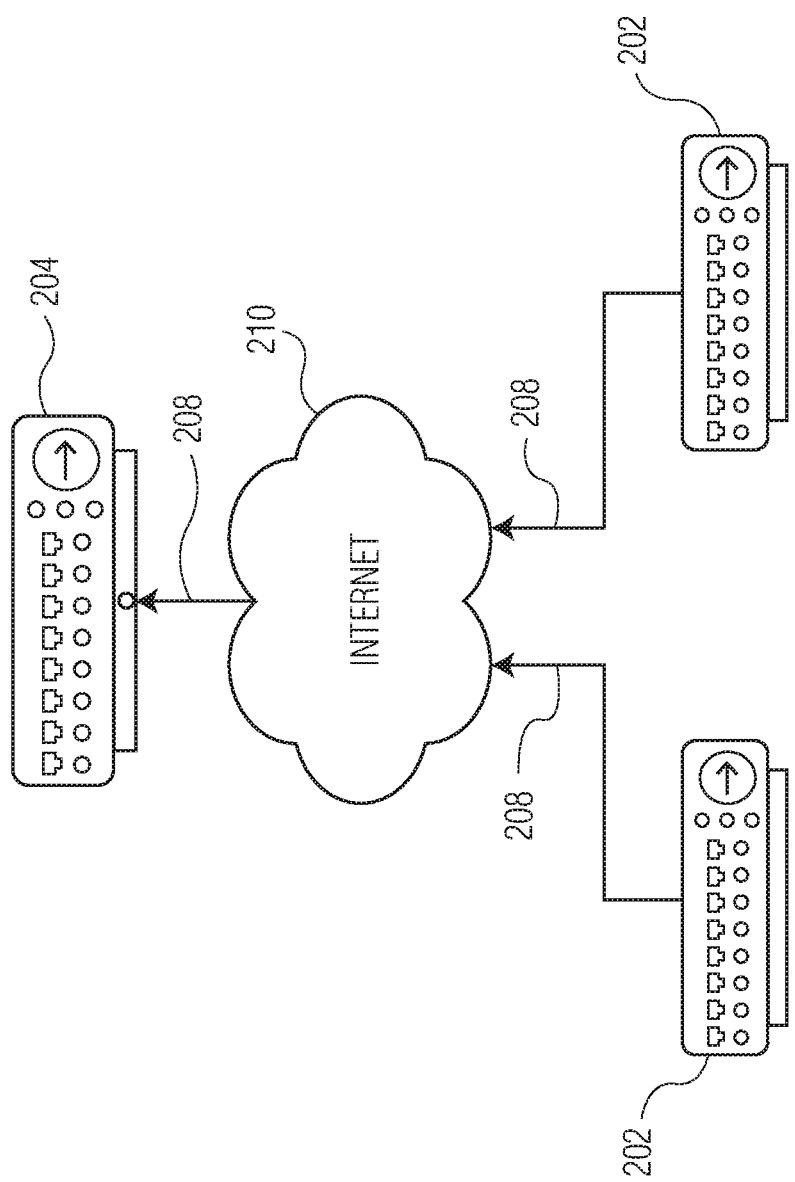
FIG. 2A illustrates two sender nodes communicatively coupled to a receiver node via the Internet.
Figure 2B:
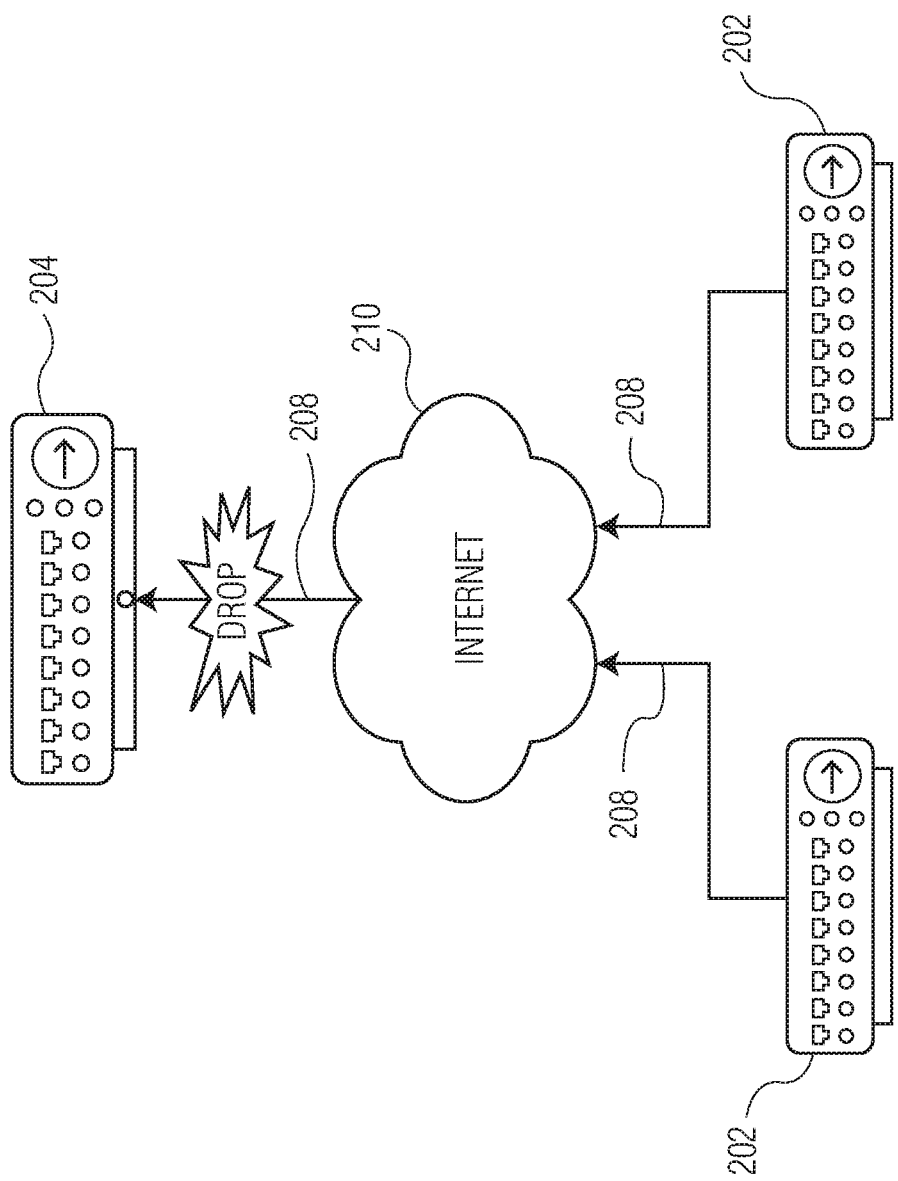
FIG. 2B illustrates a scenario in which the two sender nodes of FIG. 2A simultaneously uplink data at a maximum rate to the receiver node.

Multiple sender nodes can send data to a receiver node simultaneously. FIG. 2A illustrates two sender nodes 202 communicatively coupled to a receiver node 204 via the Internet 210. The illustrated configuration is an example of the connection configuration between branch offices and hubs as illustrated in FIG. 1. In FIG. 2A, each node is configured with an uplink and/or downlink connection 208. An uplink is a connection from a node to a WAN cloud (e.g., via the Internet) and a downlink is a connection from the WAN cloud to the node. A connection can be both an uplink and a downlink if bi-directional data flow is supported. For example, the connections between nodes in FIG. 2A can facilitate traffic flowing from the sender nodes to the receiver node as well as from the receiver node to the sender nodes. In FIG. 2A, if data is sent from the sender nodes to the receiver node (as indicated by the arrows), then the receiver node must have sufficient bandwidth to receive the data or else the data will be dropped. For example, FIG. 2B illustrates a scenario in which the two sender nodes 202 of FIG. 2A simultaneously send data to the receiver node 204. The uplink and downlink connections 208 each have a 1 Gb bandwidth. If both sender nodes send data at a rate of 1 Gbps (e.g., the maximum rate given their bandwidth), then the receiver node would need a 2 Gb connection to receive all of the data. However, because the receiver node only has a 1 Gb connection, data in excess of 1 Gb will be dropped. When data is dropped, a sender node may attempt to re-send the dropped data thus further exacerbating the problem. In other circumstances, where a sender node has a data quota, re-sending the dropped data may not be possible if the data quota is already met.

To prevent data from being dropped, a known solution is to place nodes in groups and create a policy that defines and limits a maximum threshold at which bandwidth can be used to be applied to the group. However, a node needs to be placed in a group before a policy can be applied to the node, which prevents automatic management (e.g., limiting bandwidth usage) of nodes as the nodes join the SD-WAN.

An alternative known solution to prevent data from being dropped is to apply bandwidth shaping on a local egress interface of a node. However, shaping on a local egress interface requires additional processing by a node and, because the shaping is performed by a node independent of other nodes, coordinated shaping among nodes coupled to the same hub is not possible.

In accordance with an embodiment of the invention, a method for shaping traffic across a wide area network is disclosed. The method involves advertising a data rate limit across a WAN from a first node, measuring the rate of data received at a WAN interface of the first node, and, if the measured rate of data received at the WAN interface of the first node exceeds a maximum threshold, advertising a reduced data rate limit across the WAN, and, if the measured rate of data received at the WAN interface of the first node is below a minimum threshold, advertising an increased data rate limit across the WAN. For example, when a receiver node (e.g., a first node) initializes, the receiver node advertises a data rate limit across a WAN to second nodes, such as sender nodes communicatively coupled to the receiver node. In an embodiment, nodes can be directly coupled to each other and, thus, a node can transition between being a sender node and a receiver node in accordance with the flow of traffic. Once data is being received from the sender nodes, the receiver node measures its own bandwidth usage at its WAN interface and advertises a reduced data rate limit or an increased data rate limit as needed. Because the first node is measuring its own bandwidth utilization, the first node can take the rate at which it is receiving data from all nodes communicatively coupled to the first node into consideration when determining a data rate limit to advertise. For example, rather than just arbitrarily advertising a data rate limit that is half of the downlink rate of the first node to three connected nodes, the first node can advertise a data rate limit that is an equal division of the total downlink capacity of the first node to each other node (e.g., one third of the total downlink capacity). Additionally, when a second node is initialized and communicatively coupled to the first node, the first node can advertise the data rate limit directly to the second node. For example, when a new sender node (e.g., a second node) is communicatively coupled to the receiver node, the new sender node will not know the advertised data rate limit for the receiver node. The receiver node can advertise the data rate limit directly to the new sender node. Accordingly, the new sender node can be initialized without first adding the new sender node to a group and applying a policy (e.g., as in known techniques). In another embodiment, the advertisement of the data rate limit to the new sender hub is triggered when the receiver node receives an initial data transmission from the new sender node. Thus, the receiver node does not need to consume bandwidth to advertise the data rate limit until the new sender node begins sending data.

Figure 3:
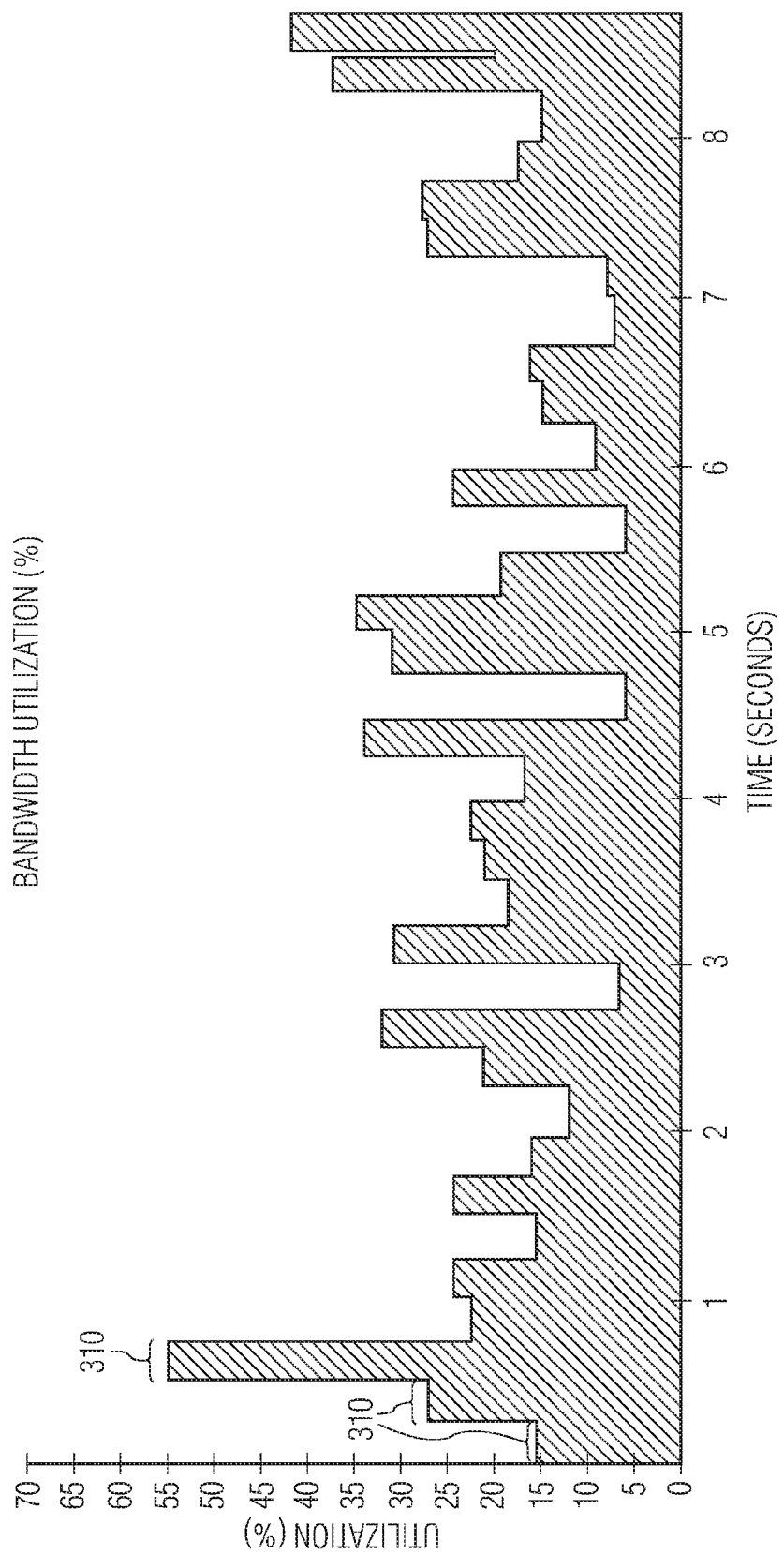
FIG. 3 is a graph of bandwidth utilization recorded by measuring the rate of data received at a WAN interface.

FIG. 3 is a graph of bandwidth utilization 300 recorded by periodically measuring the rate of data received at a WAN interface. In an embodiment, the rate of data can be measured and recorded on a defined interval 310. For example, in FIG. 3, four measurements are recorded per second. To dampen a measurement, measurements over several consecutive intervals can be averaged together to determine a dampened measurement. The number of intervals averaged together can be defined by setting a dampening count. For example, in FIG. 3, to dampen measurements over one second intervals, the damping count would be set to four.

Advertised Data Rate Limit

Figure 4A:
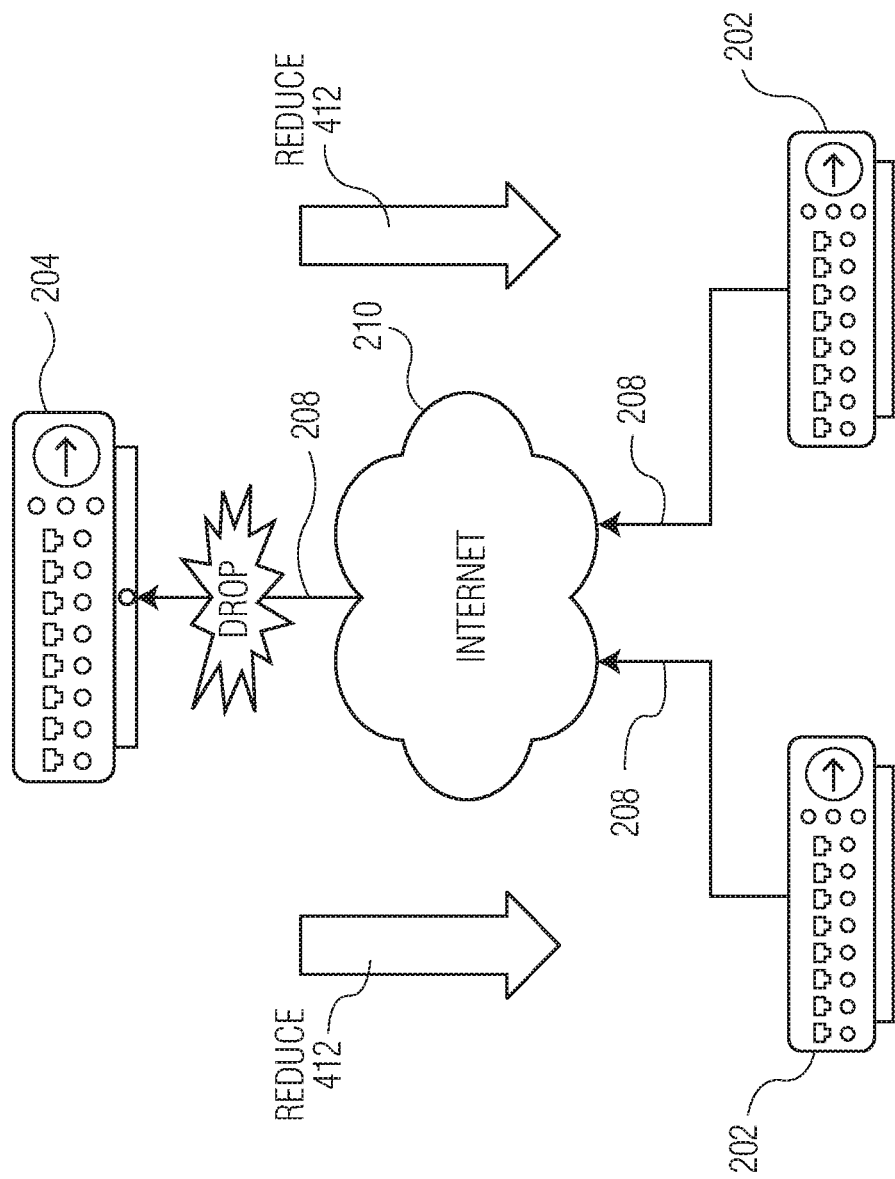
FIG. 4A illustrates the scenario of FIG. 2B in which the receiver node has been modified to advertise a reduced data rate limit when a measured rate of data received by the WAN interface of the receiver node exceeds a maximum threshold.

FIG. 4A illustrates the scenario of FIG. 2B in which the receiver node 204 has been modified to advertise a reduced data rate limit 412 when a measured rate of data received by the WAN interface of the receiver node (not shown) exceeds a maximum threshold. In the scenario of FIG. 4A, the sender nodes are each a "second node" as described in accordance with the technique for shaping traffic across a WAN. In an embodiment, the maximum threshold can be defined by a user as a fixed rate (e.g., 312 kbps), as a percentage of the total bandwidth utilization (e.g., 50%), as a percent change from the current data rate limit (e.g., a 5% reduction), or by other techniques for defining a threshold. If both sender nodes 202 send data at a maximum rate, then the combined data will exceed the bandwidth of the connection of the receiver node. Accordingly, the receiver node advertises a reduced data rate limit to the sender nodes. When the rate of data received is measured again, if the rate of data received still exceeds the maximum threshold, then the receiver node can advertise an even more reduced data rate limit to the sender nodes. The receiver node can continue to further reduce the advertised data rate limit until the rate of data received no longer exceeds the maximum threshold.

Figure 4B:
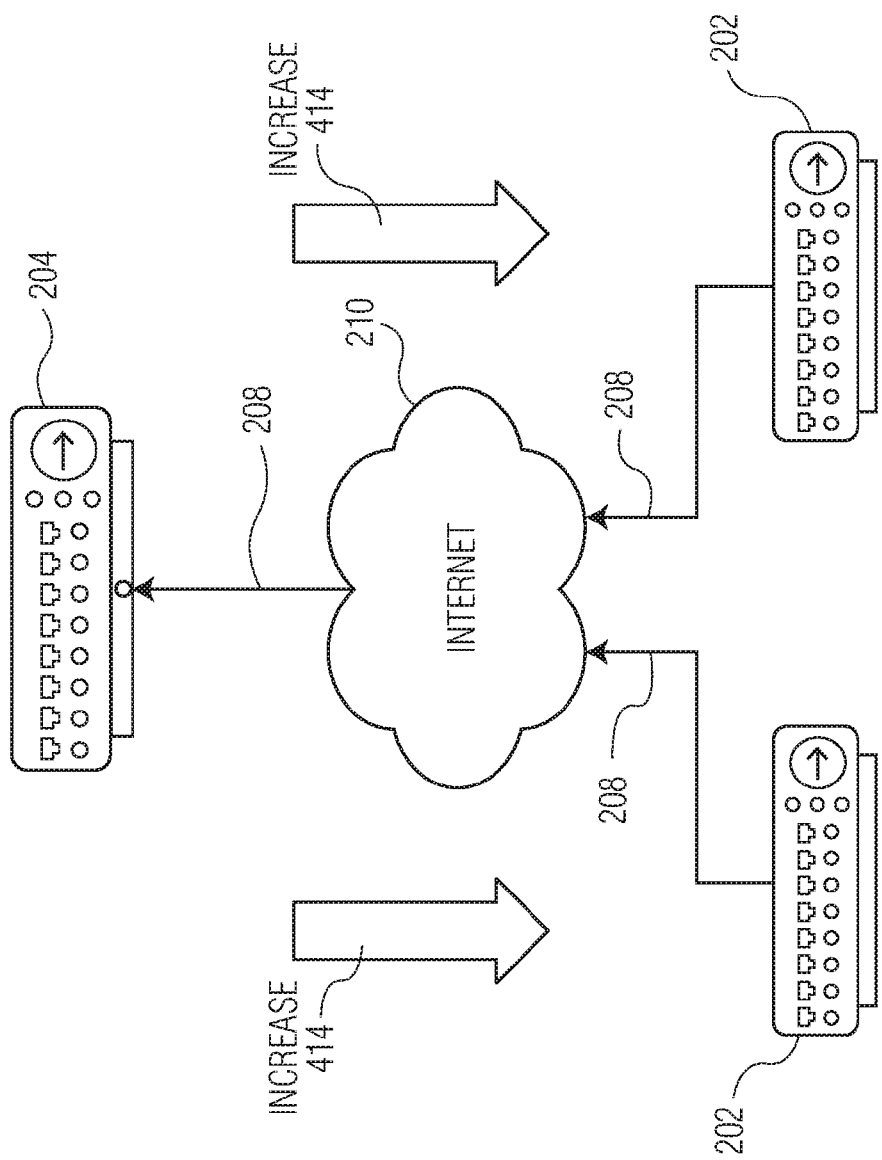
FIG. 4B illustrates the scenario in which the measured rate of data received at the WAN interface of a receiver node is below a minimum threshold.

Alternatively, if the rate of data received is measured and falls below a minimum threshold, then the receiver node can advertise an increased data rate limit to the sender nodes until the rate of data received exceeds the maximum threshold again (or until the data rate limit returns to a maximum amount equal to one hundred percent of downlink). FIG. 4B illustrates the scenario in which the measured rate of data received at the WAN interface of a receiver node (not shown) is below a minimum threshold. If both sender nodes 202 are sending data, but the combined data rate limit is less than the minimum threshold, then the receiver node 204 advertises an increased data rate limit 414 to the sender nodes. When the rate of data received is measured again, if the sender nodes are still not sending at a rate in excess of the minimum rate, then the receiver node advertises a further increased data rate limit to the sender nodes. The receiver node can continue to further increase the data rate limit until the rate of data received is either no longer below a minimum threshold or the data rate limit cannot be further increased (e.g., when the data rate limit has been raised to one hundred percent of the connection).

Figure 5:
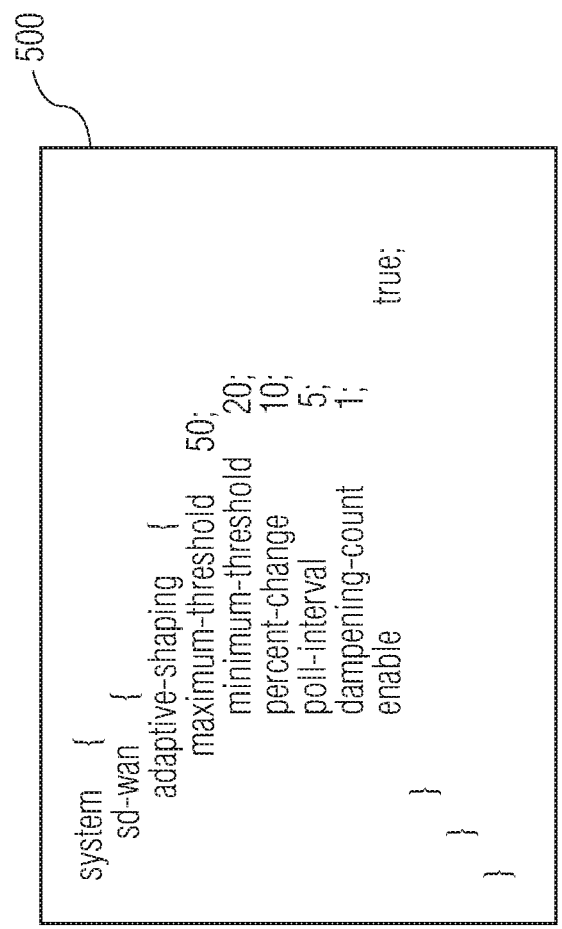
FIG. 5 is an example configuration profile of a receiver node.

Before advertising a data rate limit, connection properties and a data rate limit can be configured at a receiver node. FIG. 5 is an example of the configuration profile 500 at a receiver node. The configuration profile includes, a maximum threshold, a minimum threshold, a percent change, a poll interval, a dampening count, and an enable variable. The maximum threshold sets the value or percentage of a downlink connection of the receiver node that can be in use before advertising of a reduced data rate limit occurs. In the example of FIG. 5, when 50% or more of the downlink connection of the receiver node is in use, advertising of a reduced data rate limit occurs. The minimum threshold sets the value or percentage of the downlink connection of the receiver node that must be in use. If usage drops below the minimum threshold, advertising of an increased data rate limit occurs. In the example of FIG. 5, if usage drops below 20%, then advertising of an increased data rate limit occurs. The percent change defines the increment by which the advertisement increases or reduces the data rate limit. In the example of FIG. 5, if a data rate limit needs to be advertised, the advertised data rate limit will be a 10% change from the current data rate limit. The poll interval sets the frequency with which the rate of data received is measured. In the example of FIG. 5, the poll interval is set to five and so the rate of data received is measured on five second intervals. The damping count is the number of poll intervals to wait before determining if the rate of data received exceeds the maximum threshold or is below the minimum threshold. In the example of FIG. 5, the damping count is set to one so a single measurement where the rate of data received exceeds the maximum threshold or is below the minimum threshold would trigger advertising of a new data rate limit. The enable variable allows for the above described technique to be turned on or turned off. In the example of FIG. 5, the enable variable is set to true so the technique is enabled.

Figure 6:
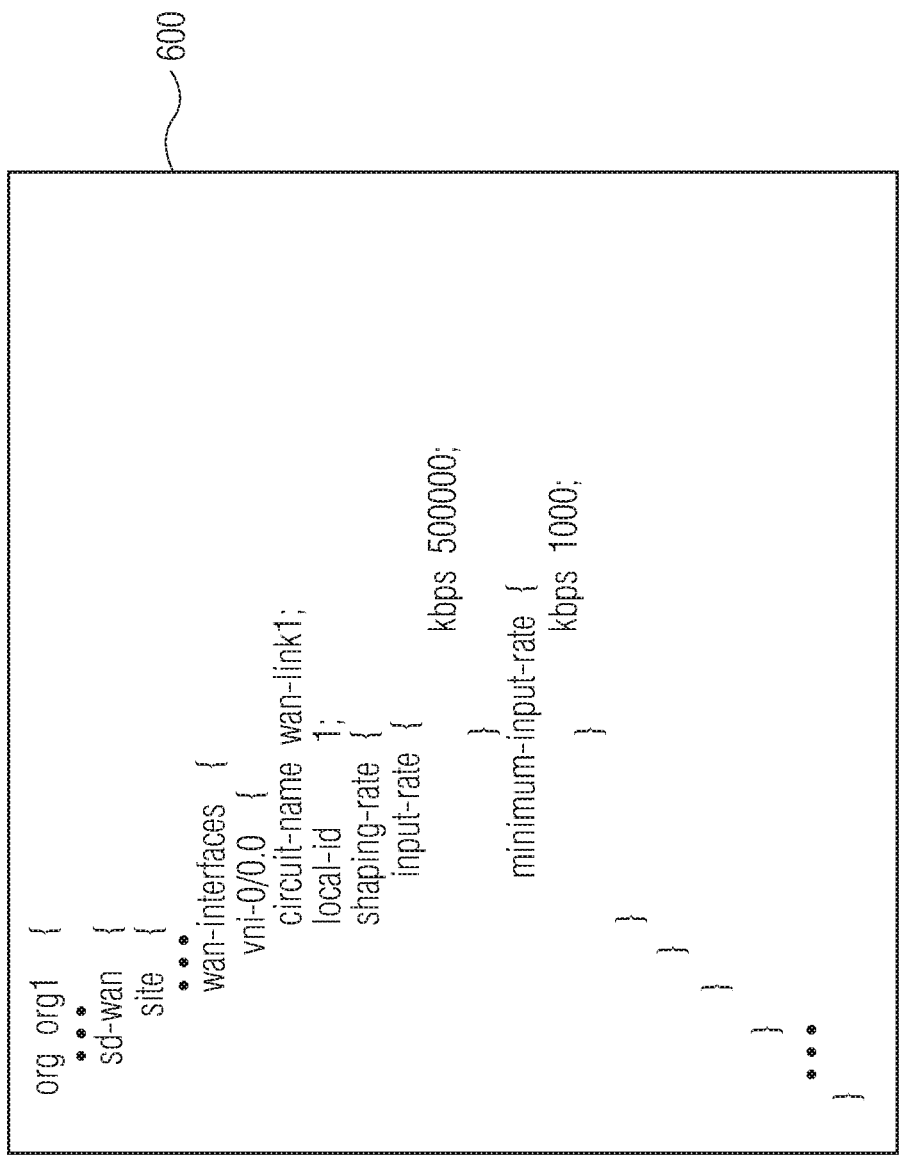
FIG. 6 is a further example of a configuration profile of a receiver node.

When a receiver node determines a data rate limit, the receiver node communicates the data rate limit to sender nodes. In an embodiment, the data rate limits can be communicated using an extension of a Border Gateway Protocol (BGP) in BGP notification messages. FIG. 6 is a further example of a configuration profile 600 of a receiver node. In the example, a link on a WAN interface is identified (e.g., vni-0/0.1) and a maximum threshold and a minimum threshold are communicated. In the example of FIG. 6, the maximum threshold is communicated as an input-rate of 500 mbps (500,000 kbps) and the minimum threshold is communicated as a minimum input rate of 1 mbps (1000 kbps).

Multi-Tenancy

Figure 7A:
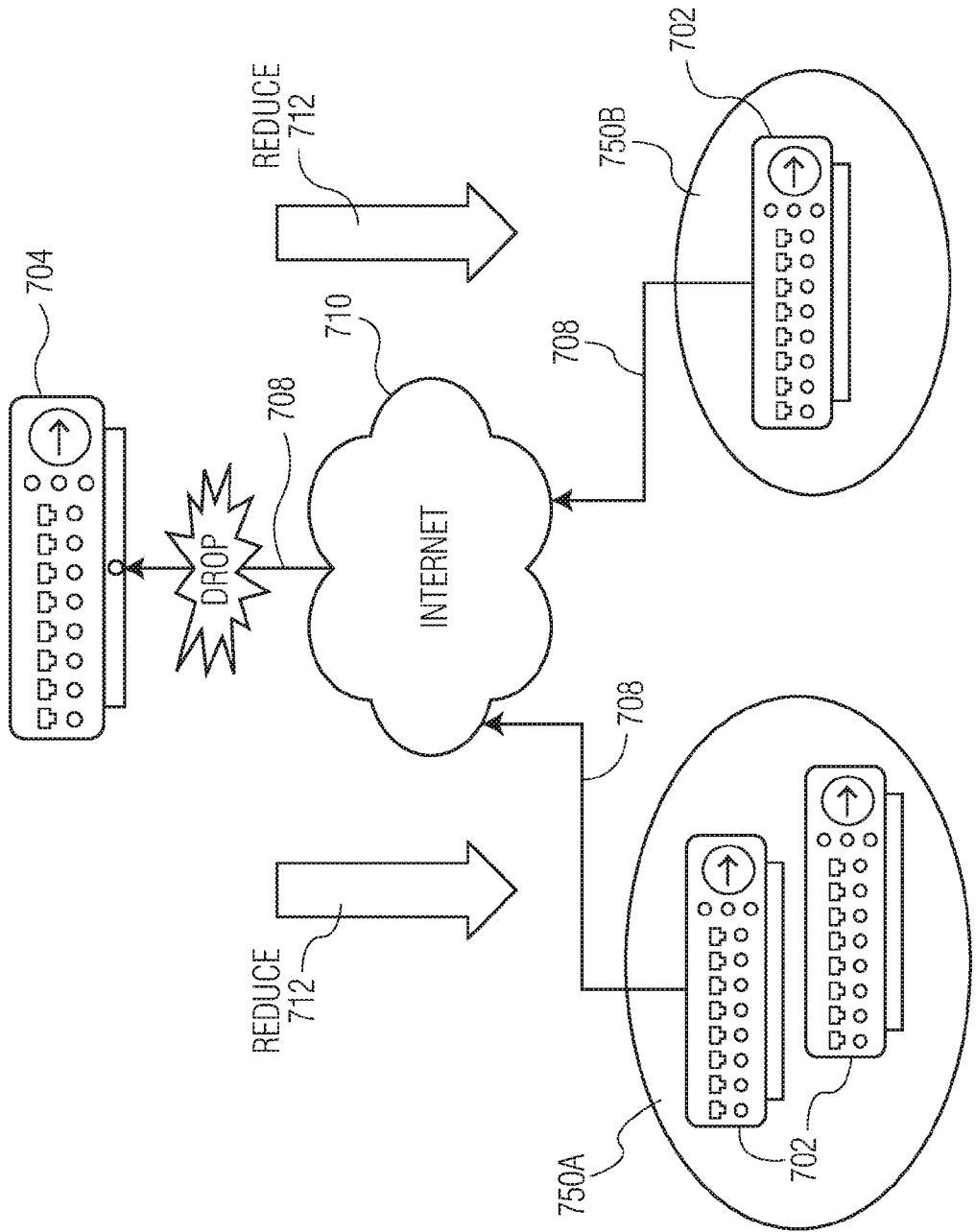
FIG. 7A illustrates two sender nodes belonging to a first tenant and one sender node belonging to a second tenant communicatively coupled to a receiver node via the Internet, the sender nodes sending data in excess of the downlink bandwidth of the receiver node.

In addition to advertising a data rate limit to all sender nodes, different data rate limits can be advertised to sender nodes on a tenant by tenant basis. A tenant refers to a user to whom multiple nodes can belong. For example, each business in a multi-tenant office building can be a tenant and computers within each office can be sender nodes belonging to each tenant. FIG. 7A illustrates two sender nodes 702 belonging to a first tenant 750A and one sender node 702 belonging to a second tenant 750B communicatively coupled to a receiver node 704 via connections 708 to the Internet 710. In an embodiment, if both sender nodes belonging to the first tenant send data at a maximum rate and the sender node belonging to the second tenant sends data at a maximum rate, then the combined rate at which data is sent may exceed the bandwidth of the receiver node. However, rather than advertise a reduced data rate limit to all sender nodes evenly, the receiver node can advertise a reduced data rate limit 712 to sender nodes proportional to the use by each tenant. Accordingly, the data rate limit for sender nodes of the tenant using less of the bandwidth of the receiver node will receive a higher advertised data rate limit than the sender nodes of the tenant using more of the bandwidth of the receiver node. The amount of bandwidth used by each tenant can be determined using known techniques for determining usage. For example, a greater reduced data rate limit can be advertised to sender nodes determined to belong to the first tenant (e.g., 25% of the total downlink bandwidth) than to the sender node determined to belong to the second tenant (e.g., 50% of the total downlink bandwidth) because the first tenant is using a greater portion of the downlink connection of the receiver node than the second tenant.

Figure 7B:
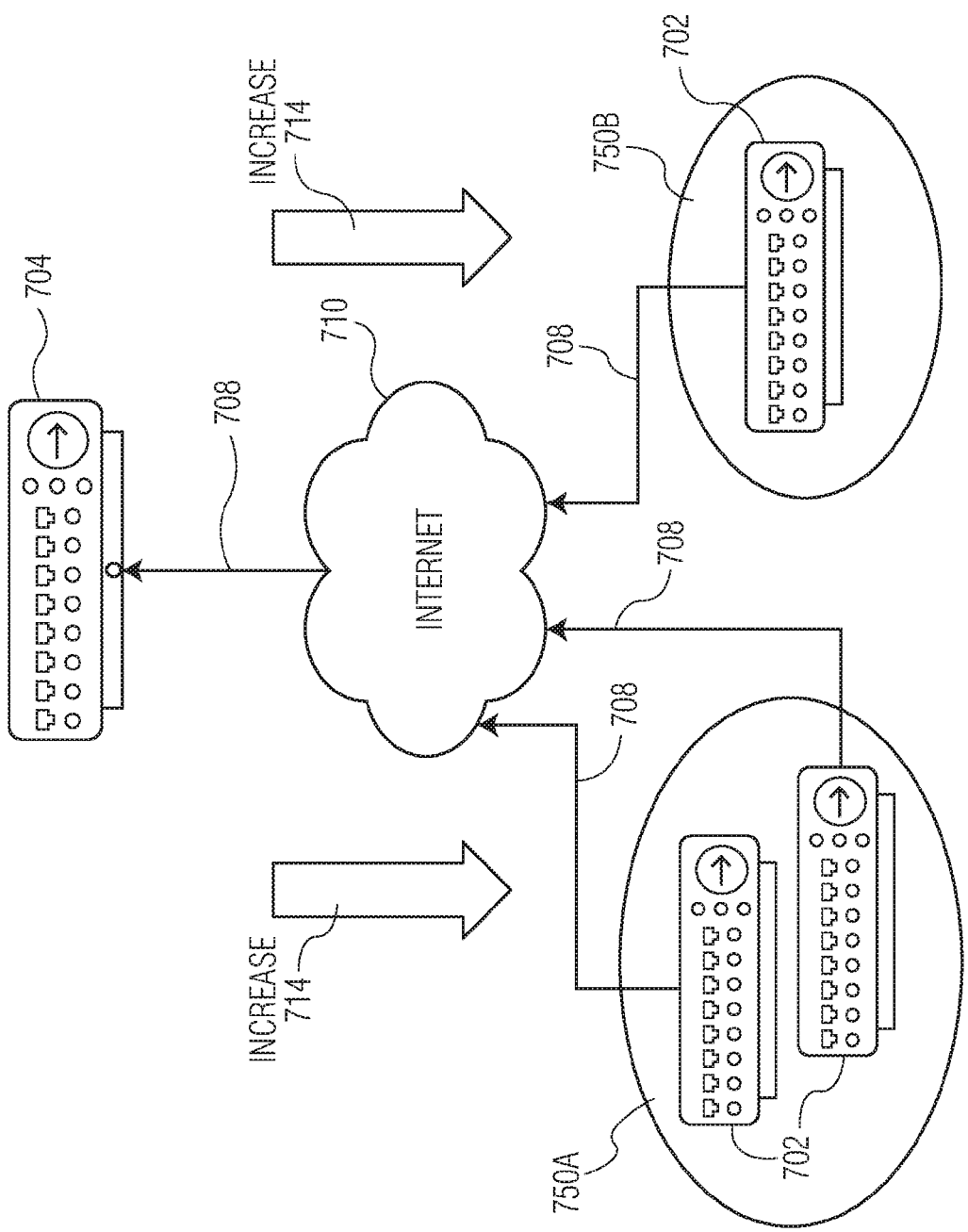
FIG. 7B illustrates the configuration of FIG. 7A when the rate of data received at the WAN interface of the receiver node is below a minimum threshold.

FIG. 7B illustrates the configuration as FIG. 7A when the rate of data received at the WAN interface of the receiver node is below a minimum threshold. If the sender nodes belonging to the first tenant are sending more data than the sender node belonging to the second tenant (e.g., individually or combined), then the data rate limit for the sender nodes belonging to the first tenant can be increased at a slower rate than the data rate limit for the sender node belonging to the second tenant. Accordingly, the increased data rate limit 714 advertised to sender nodes of the tenant using less bandwidth of the receiver node will receive a higher advertised data rate limit than the sender nodes of the tenant using more bandwidth of the receiver node.

Rate Slabbing

When a sender node receives an advertised rate from a receiver node, the sender node configures an egress interface used for forwarding data to the receiver node to have a data rate limit as advertised by the receiver node. For example, if a sender node forwards data to a receiver node via interface vni-0/0 and receives an advertised data rate limit of 710000 kbps, then the sender node will configure interface-0/0 to use a data rate limit of 710000 kbps. In an N×N configuration, a sender node can be communicatively coupled to many receiver nodes and can receive advertised data rate limits from each of the receiver nodes. In order to configure a port for each advertised data rate limit, the sender node may configure and store a configuration profile for a number of ports equal to the number of receiver nodes communicatively coupled to the sender node. However, due to memory or other limitations, a sender node may be limited in the number of different ports it can configure and store. For example, a sender node may only be able to configure and store configuration profiles for 98 different ports. Because only 98 different port configurations can be stored, if more than 98 receiver nodes advertise a data rate limit, then data rate limits will be ignored. For example, if a $99^{th}$ data rate limit is advertised to the sender node by a new receiver node, then the sender node would not be able to accommodate the $99^{th}$ data rate limit.

In order to accommodate data rate limits for all receiver nodes, rate slabbing can be used. Rate slabbing may involve dividing the bandwidth of an uplink connection of a sender node into a number of data rate limits called "slabs". The number of slabs can be equal to the maximum number of configuration profiles the sender node can store, but a smaller number of slabs can be used as well. When the sender node receives an advertised data rate limit, the sender node can select a slab by mapping the advertised data rate limit to a slab data rate limit. In an embodiment, a data rate limit can be mapped to a slab data rate limit by rounding down to the closest slab data rate limit. FIG. 8 illustrates an exemplary truncated list 800 of rate slabs 802. In the example, the rate slabs correspond to a 1 GB port, but the bandwidth can vary with the port speed and uplink bandwidth configured on the sender node in accordance with an embodiment of the invention. In the example of FIG. 8, each rate slab corresponds to a different data rate limit. For example, rate slab 1 corresponds to a data rate limit of 383 kbps, while rate slab 98 corresponds to a data rate limit of 906,317 kbps (approx. 906 mbps). In an embodiment, a sender node using the list of slabs shown in FIG. 8 would use a data rate limit of 708464 kbps when sending data to a receiver node advertising a data rate limit of 710000 kbps because a data rate limit of 710000 kbps rounds down to 708464 kbps, which is the data rate limit of slab 93. Accordingly, a large number of advertised data rate limits can be accommodated by mapping the advertised data rate limits to slabbed data rate limits.

Figure 9:
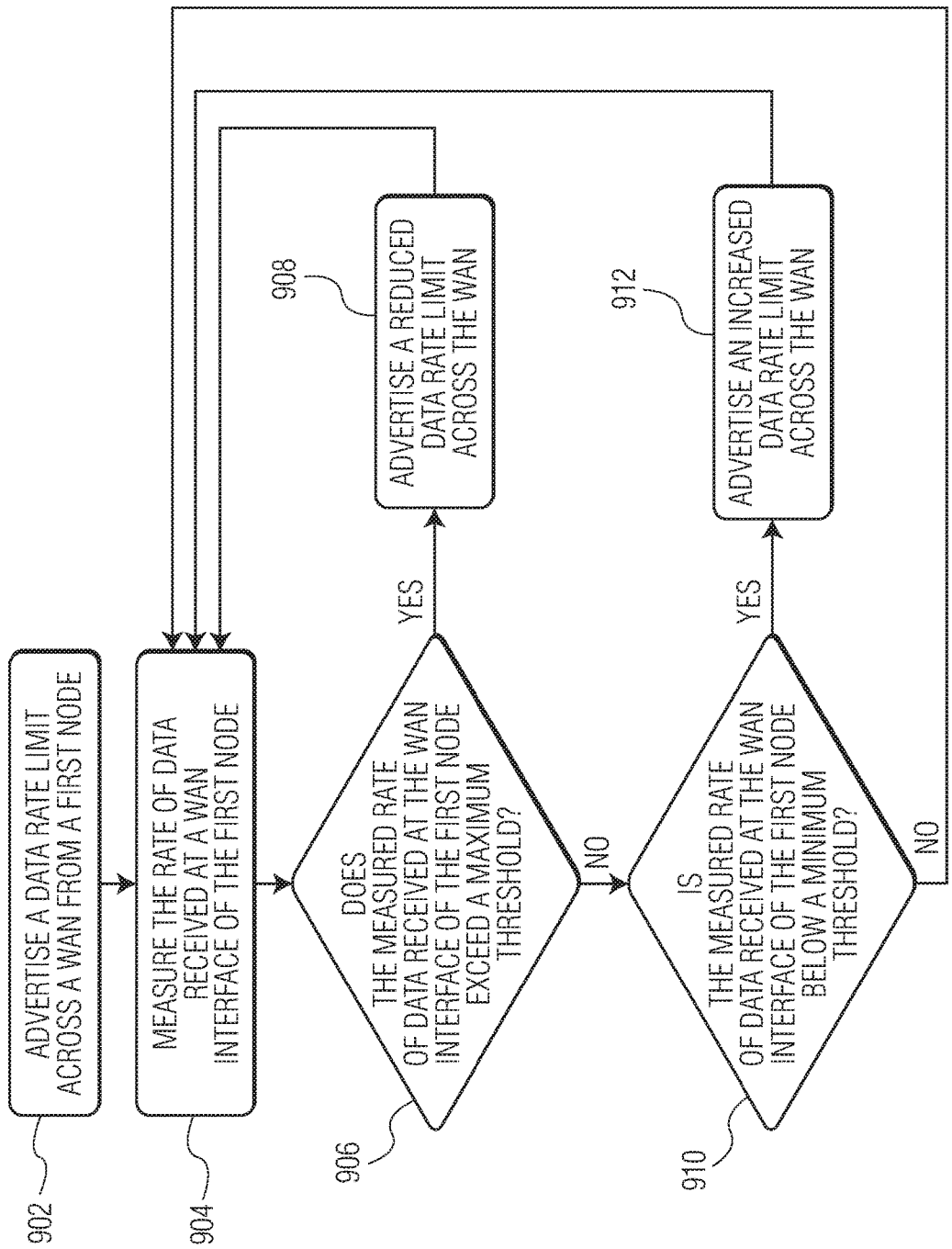
FIG. 9 is a flow chart diagram of a method for shaping traffic across a wide area network.

FIG. 9 is a flow chart diagram of a method for shaping traffic across a wide area network. At block 902, a data rate limit is advertised across a WAN from a first node. In an embodiment, the data rate limit is advertised as a rate at which data can be received and is a predefined value. At block 904, the rate of data received at a WAN interface of the first node is measured. In an embodiment, the rate of data received at a WAN interface of the first node is measured on a defined interval and can be measured on a per tenant basis. In another embodiment, a measurement of the rate at which data can be received is determined by a plurality of consecutive measurements. At decision point 906, if the measured rate of data received by the WAN interface of the first node exceeds a maximum threshold, then, at block 908, a reduced data rate limit is advertised across the WAN. In an embodiment, the reduced data rate limit is advertised as a percent change from the data rate limit and can be advertised to all nodes communicatively coupled to the first node at once. For example, if two nodes are communicatively coupled to the first node, then a notification can be sent to both nodes simultaneously advertising the reduced data rate limit. If, at decision point 906, the measured rate of data received at the WAN interface of the first node does not exceed a maximum threshold, then the technique moves to decision point 910. At decision point 910, if the measured rate of data received at the WAN interface of the first node is not below a minimum threshold, the technique can return to block 904 or wait a period of time (e.g., a period of time defined by the poll interval of FIG. 5) and, if the measured rate of data received by the WAN interface of the first node is below a minimum threshold, then, at block 912, an increased data rate limit is advertised across the WAN. In an embodiment, the increased data rate limit is advertised as a percent change from the data rate limit and can be advertised to all nodes communicatively coupled to the first node at once.

Figure 10:
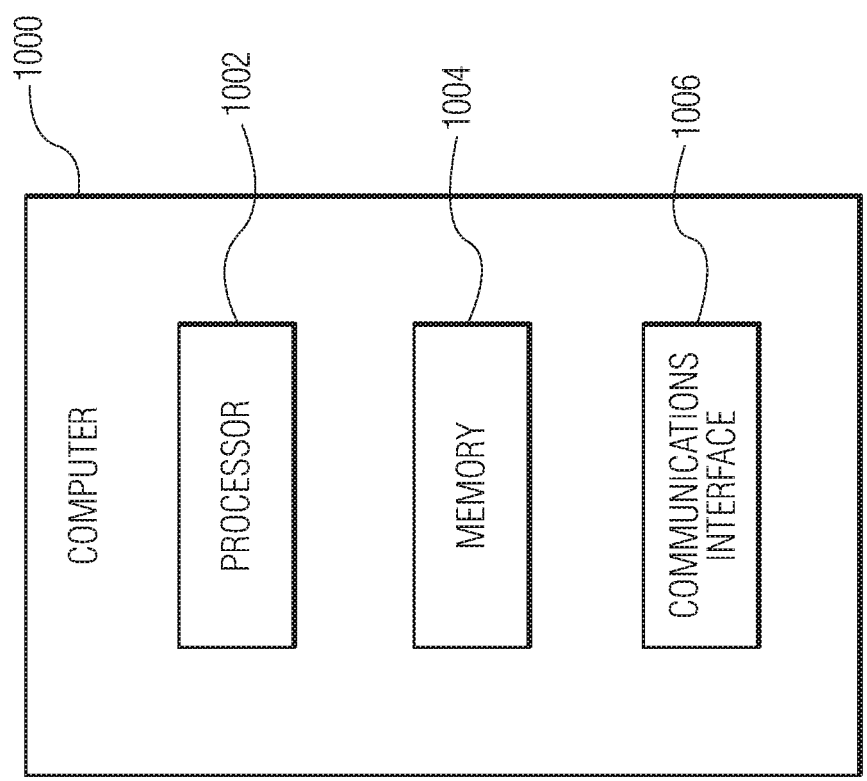
FIG. 10 is a block diagram of a computer.

FIG. 10 is a block diagram of a computer 1000 that includes a processor 1002, memory 1004, and a communications interface 1006. The processor may include a multi-function processor and/or an application-specific processor. Examples of processors include the PowerPC™ family of processors by IBM and the x86 family of processors by Intel. The memory within the computer may include, for example, a non-transitory storage medium such as read only memory (ROM), flash memory, RAM, and a large capacity permanent storage device such as a hard disk drive. The communications interface enables communications with other computers via, for example, the Internet Protocol (IP). The computer executes computer readable instructions stored in the storage medium to implement various tasks as described above.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

It should also be noted that at least some of the operations for the methods may be implemented using software instructions stored on a non-transitory computer-readable storage medium for execution by a computer. As an example, an embodiment of a non-transitory computer-readable storage medium includes a computer useable storage medium configured to store a computer readable program that, when executed on a computer, causes the computer to perform operations, as described herein.

Furthermore, embodiments of at least portions of the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The computer-useable or computer-readable medium can be an electronic, magnetic, optical, electromagnetic, infrared, or semiconductor system (or apparatus or device), or a propagation medium. Examples of a computer-readable medium include a semiconductor or solid state memory, magnetic tape, a removable computer diskette, a random access memory (RAM), a read-only memory (ROM), a rigid magnetic disc, and an optical disc. Current examples of optical discs include a compact disc with read only memory (CD-ROM), a compact disc with read/write (CD-R/W), a digital video disc (DVD), and a Blu-ray disc.

In the above description, specific details of various embodiments are provided. However, some embodiments may be practiced with less than all of these specific details. In other instances, certain methods, procedures, components, structures, and/or functions are described in no more detail than to enable the various embodiments of the invention, for the sake of brevity and clarity.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A method for shaping traffic across a wide area network (WAN), the method comprising:
    advertising a data rate limit across the WAN from a first node;
    measuring the rate of data received at a WAN interface of the first node; and when the measured rate of data received at the WAN interface of the first node exceeds a maximum threshold, advertising a reduced data rate limit across the WAN; and when the measured rate of data received at the WAN interface of the first node is below a minimum threshold, advertising an increased data rate limit across the WAN;
    wherein notification messages sent to nodes of a first tenant advertise a first data rate limit and notification messages sent to nodes of a second tenant advertise a second data rate limit:
    when the first node is receiving more data from the first tenant than the second tenant, advertising a lower data rate limit in the notification messages sent to nodes of the first tenant than the data rate limit advertised in the notification messages sent to nodes of the second tenant.

2. The method of claim 1, wherein the data rate limit is advertised to all nodes communicatively coupled to the first node.

3. The method of claim 1 further comprising, advertising the data rate limit to a second node, wherein the advertising to the second node is triggered when data is first received from the second node by the first node.

4. The method of claim 1, wherein the measured rate of data is a dampened measurement determined by averaging a plurality of consecutive measurements.

5. The method of claim 1, wherein advertising the data rate limit by the first node comprises sending Border Gateway Protocol notification messages to nodes communicatively coupled to the first node.

6. The method of claim 1, wherein when the reduced data rate limit is below a minimum threshold, the reduced data rate limit is not advertised.

7. The method of claim 1, wherein advertising the reduced data rate limit and advertising the increased data rate limit comprises advertising a percent change from the data rate limit.

8. The method of claim 1, wherein upon receiving an initial data transmission from a second node at the first node, advertising a reduced data rate limit to all nodes communicatively coupled to the first node.

9. A computing device for shaping traffic across a wide area network (WAN), the computing device comprising a memory and a processor, the memory comprising instructions that, when executed by the processor, cause the processor to perform steps comprising:

advertising a data rate limit across the WAN from a first node;

measuring a rate of data received at a WAN interface of the first node; and when the measured rate of data received at the WAN interface of the first node exceeds a maximum threshold, advertising a reduced data rate limit across the WAN; and when the measured rate of data received at the WAN interface of the first node is below a minimum threshold, advertising an increased data rate limit across the WAN;

wherein notification messages sent to nodes of a first tenant advertise a first data rate limit and notification messages sent to nodes of a second tenant advertise a second data rate limit;

wherein when the first node is receiving more data from the first tenant than the second tenant advertising a lower data rate limit in the notification messages sent to nodes of the first tenant than the data rate limit advertised in the notification messages sent to nodes of the second tenant.

10. The computing device of claim 9, wherein the data rate limit is advertised to all nodes communicatively coupled to the first node.

11. The computing device of claim 9, wherein the steps performed further comprise, advertising the data rate limit to a second node, wherein the advertising to the second node is triggered when data is first received from the second node by the first node.

12. The computing device of claim 9, wherein the measured rate of data is a dampened measurement determined by averaging a plurality of consecutive measurements.

13. The computing device of claim 9, wherein advertising the data rate limit by the first node comprises sending Border Gateway Protocol notification messages to nodes communicatively coupled to the first node.

14. The computing device of claim 9, wherein when the reduced data rate limit is below a minimum threshold, the reduced data rate limit is not advertised.

15. The computing device of claim 9, wherein advertising the reduced data rate limit and advertising the increased data rate limit comprises advertising a percent change from the data rate limit.

16. The computing device of claim 9, wherein upon receiving an initial data transmission from a second node at the first node, advertising a reduced data rate limit to all nodes communicatively coupled to the first node.

* * * * *